April 12, 1949. A. J. PASTL 2,467,221
DENTAL FLOSS APPLICATOR
Filed Oct. 4, 1946
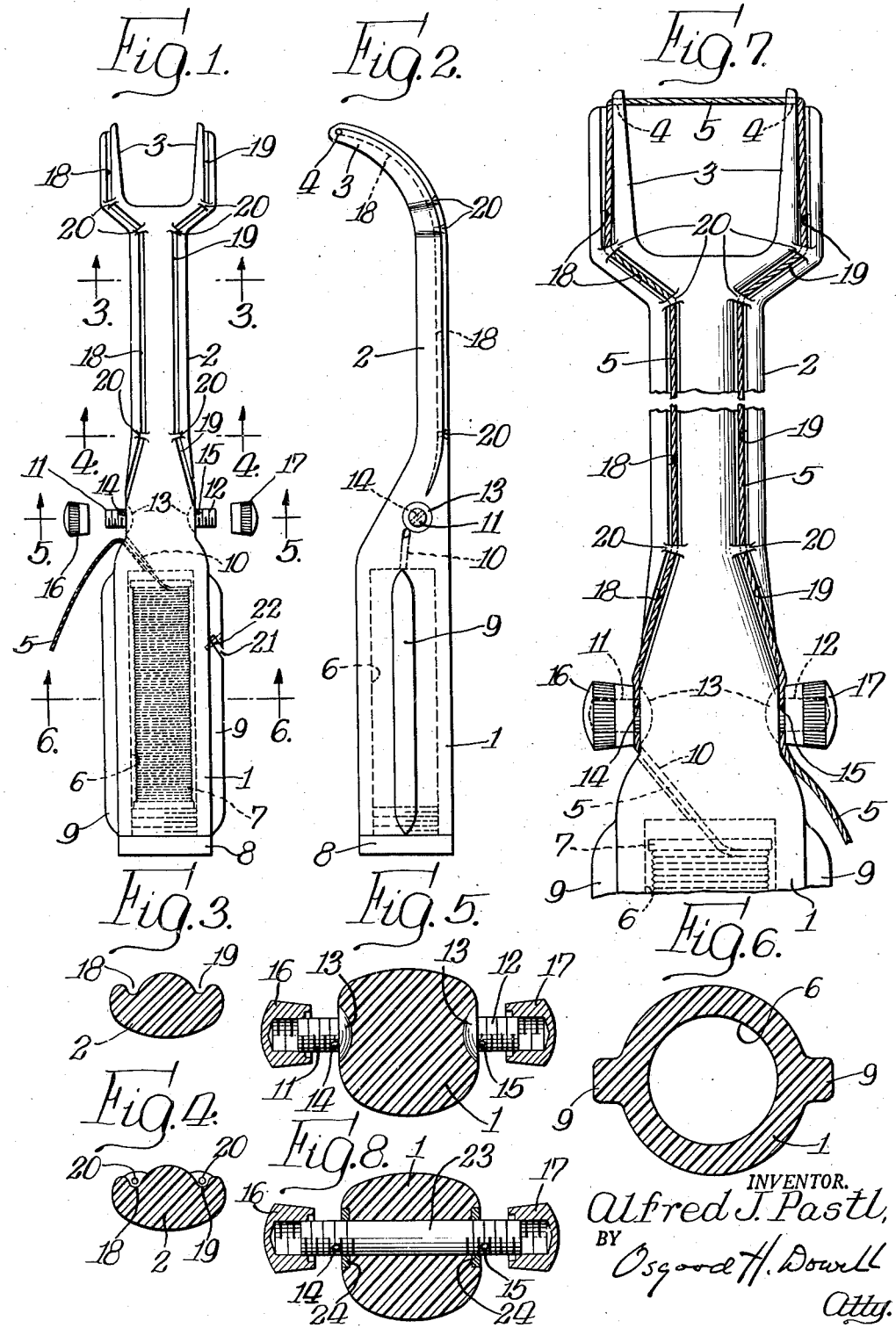
INVENTOR.
Alfred J. Pastl,
BY Osgood H. Dowell
Atty.

Patented Apr. 12, 1949

2,467,221

UNITED STATES PATENT OFFICE 2,467,221

DENTAL-FLOSS APPLICATOR

Alfred J. Pastl, Chicago, Ill.

Application October 4, 1946, Serial No. 701,167

4 Claims. (Cl. 132—92)

This invention pertains to a tooth-cleaning implement of the type herein refered to as a dental floss applicator, comprising a forked holder for a strand of dental floss, which is held taut across the gap between the bifurcations of the implement, the forked part of the implement being operable in the mouth for working the strand of dental floss between and against opposing surfaces of adjacent teeth.

The object of the invention is to provide an improved implement of this type, having in view efficiency and convenience in use, as well as simplicity and practicability.

The invention will be described with reference to the accompanying drawings, wherein there is shown for illustration a device of one practicable construction embodying the invention.

In said drawings:

Fig. 1 is a front elevation of the illustrative device, with certain fastening nuts thereof shown removed.

Fig. 2 is a side elevation of the illustrative device, omitting the nut which goes on the screw 11 appearing in this view.

Figs. 3, 4, 5 and 6 are cross sections taken respectively on the lines 3—3, 4—4, 5—5 and 6—6 of Fig. 1, looking in the direction of the arrows.

Fig. 7 is an enlarged partial front elevation of the illustrative device shown holding taut a strand of dental floss 5 strung thereon, an intermediate part of the device being broken away and the parts shown being brought close together for compactness of illustration.

Fig. 8 is a view similar to Fig. 5 showing a modification.

The body of the illustrative device may be a one-piece molded plastic article, and will be assumed to be such in the following description, though it may be of non-corrosive metal or other suitable material.

The body comprises a handle 1 from which extends a shank 2 formed with a forked or bifurcated head, the bifurcations or arms 3 of which are formed in their extremities with eyes 4 through which to thread the strand 5 of dental floss to be held by the device.

The handle 1 is recessed as at 6 to contain a spool of dental floss 7 which can be inserted endwise into the handle when its rear end cap 8 is removed. In Fig. 6 the handle is shown as of round cross-section but formed with exterior longitudinal ribs 9 for a better grip by the hand.

From the spool 7 the strand of dental floss 5 may be drawn through the outlet passage 10 extending from the fore end of the recess 6 to one side of the body of the device.

Adjacent to the spool-containing portion of the handle, the body is provided with a pair of screw-threaded studs 11 and 12, which are fixed to and project from opposite sides of the body. These studs are shown as headed screws having their heads 13 embedded in the plastic body, with the under sides of the heads exposed. Extending through the screw 11 transversely thereof is a hole 14 through which to thread the strand of dental floss. The screw 12 has a similar hole 15 for a similar purpose. These holes 14 and 15 are immediately adjacent to the screw-heads 13. Thumb nuts 16 and 17 engaging the respective screws are adapted to be screwed thereon against the heads 13 for clamping the strand of dental floss between said nuts and heads.

There are formed in the front of the body of the device two longitudinally arranged series of grooves, those of one series being designated by the numeral 18 and those of the other series being designated by the numeral 19. The grooves of each series are arranged end to end and in communication with one another through eyes 20 formed by apertured end walls of adjacent grooves. The effect is that of continuous grooves having eyes fixed therein at suitable intervals. The two series of grooves 18 and 19 extend along the shank 2 from points adjacent the screws 11 and 12 to the eyes 4 in the terminal portions of the arms of bifurcations 3 of the forked head of the device.

After the strand 5 has been threaded through the hole 14 in the screw 11, it is drawn through the series of grooves 18 and eyes 20 therein to the eye 4 in one of the bifurcations 3 and across the gap there between and through the eye in the other bifurcation, and then back through the series of grooves 19 and eyes therein to the screw 12 and threaded through the hole 15 in the latter. While the strand is slack, it is held in the grooves by the eyes 20, and when it is drawn taut it lies in the bottoms of the grooves by virtue of the curvature of the arms or bifurcations 3 and the curvature indicated in Fig. 2 of those grooves of the series 18 and 19 which are adjacent to the screws 11 and 12.

In using the device, the strand of dental floss is threaded thereon in the manner above described and illustrated in Fig. 7, and is secured at 14 by screwing the nut 16 against the head of the screw 11, and is then drawn taut and secured at 15 by screwing the nut 17 against the head of the screw 12, whereupon the device is ready for use as a tooth-cleaning implement.

After the implement has been used for tooth cleaning, it can be readily conditioned for an ensuing operation by loosening the nuts, drawing the used portion of the strand of dental floss past the screw 12, then tightening the nut 16, drawing the strand taut again and securing it by the nut 17.

To provide for conveniently cutting the strand after it has been drawn past the screw 12, one of the ribs 9 has an inclined slit 21 across which is disposed a small knife blade 22, so that, after tightening the nut 17, the previously used portion of the strand can be cut off by catching the strand in the slit 21 and then giving a slight pull on the free end of the strand.

One of the advantages of the illustrative device is the expedition with which it can be made ready for use and successively reconditioned for subsequent uses with accompanying severage of the previously used portions of the dental floss. Since the strand is threaded through the holes 14 and 15, it can be easily and quickly secured at these points by merely screwing up and tightening the nuts 16 and 17, without necessity of having to finger the strand to position it under the nuts, and without liability of displacement of the strand from position to be clamped. The strand is effectually secured against slippage by being clamped at both sides of the screws 11 and 12. Drawing the strand through the holes 14 and 15, which may be somewhat out of line with the course of the strand, is also of advantage for effecting a frictional engagement of the screws with the strand. As the strand when clamped by the nut 16 is not liable to slip, it is only necessary to draw it taut by a single steady pull and to secure it by the nut 17 in order to make it ready for an operative use, thus avoiding the wear on the fingers that would be incident to having to readjust fastenings and to pull a succession of times on the free end of the strand to make ready for use.

The strand will slip easily through the grooves 18 and 19 and interposed eyes 20, so that such a hard pull on the strand as to be unduly wearing on the fingers is not necessary. The course of the strand follows the longitudinal contour lines of the shank 2 and arms or bifurcations 3, and there are no objectionable stretches of the strand between the eyes 4 and shank or outside of the contour of the body of the device. The body is smooth surfaced, and is free from protuberances other than the screws 11 and 12 and nuts thereon, which are remote from the forked head or part of the device which is to be operated in the mouth. When the strand is slack, it is nevertheless retained in the grooves, and when taut it lies in the bottoms of the grooves, so that it will not be felt either in the mouth or by the hand operating the device.

As will be apparent, the device is highly practical, efficient and convenient, simple in construction and for use, and also susceptible of economical manufacture.

Referring to Fig. 5, the two screws 11 and 12 could be rigidly connected by an embedded stem, said screws and stem being molded in one piece. Instead of the two separate screws 11 and 12, there might be substituted a stem embedded in the plastic body and having threaded end portions projecting from opposite sides thereof, as shown by Fig. 8 wherein such stem is designated by the numeral 23, and the nuts 16 and 17 engaging such threaded end portions could clamp the strand of dental floss against metal washers 24 fitted on such stem and embedded in said plastic body. The illustrative device may be otherwise variously modified in details within the scope of the invention as defined in the appended claims.

I claim:

1. An implement of the class described comprising a handle having extending therefrom a shank formed with a forked or bifurcated head and adapted for holding a strand of dental floss stretched across the gap between the bifurcations of said head, said handle having opposite flat metallic surfaces and a pair of screw-threaded studs fixed to and projecting from opposite sides of the handle and surrounded by said surfaces, said studs having holes through which to thread said strand extending transversely through said studs immediately adjacent to said surfaces, and nuts engageable with said studs and cooperable with said surfaces for clamping said strand at both sides of said studs.

2. An implement of the class described comprising a handle having extending therefrom a shank formed with a forked or bifurcated head and adapted for holding a strand of dental floss stretched across the gap between the bifurcations of said head, and means for securing the strand at opposite sides of the handle, said forked shank having two longitudinally disposed series of grooves and interposed eyes through which to guide the strand between the respective securing means and the ends of the respective bifurcations, the grooves of each series being arranged end to end out of line with one another and said eyes being between adjacent ends of the grooves, there being also eyes through which to thread the strand in the ends of said bifurcations.

3. In an implement of the class described comprising a molded plastic body forming a shank with a bifurcated head and adapted for holding a strand of dental floss stretched across the gap between the bifurcations of said head, means remote from said head for securing said strand at opposite sides of said body comprising fixed oppositely projecting screws having heads embedded in said body with their under sides exposed, said screws having holes through which to thread said strand extending transversely through said screws immediately adjacent to said heads, and nuts engageable with said screws and cooperable with said heads for clamping said strand at both sides of said screws.

4. In an implement of the class described comprising a molded plastic body forming a shank with a bifurcated head and adapted for holding a strand of dental floss stretched across the gap between the bifurcations of said head, means remote from said head for securing said strand at opposite sides of said body, comprising a stem embedded in and extending through said body transversely thereof and having threaded end portions projecting from opposite sides of said body, washers fitted on said stem and embedded in said body with their outer faces exposed, said threaded end portions having holes through which to thread said strand extending transversely through said threaded end portions immediately adjacent to the outer faces of said washers, and nuts engageable with said threaded end portions and cooperable with said washers for clamping said strand at both sides of the respective projecting portions of the screw.

ALFRED J. PASTL.

REFERENCES CITED

The following references are of record in the file of this patent:

UNITED STATES PATENTS

| Number | Name | Date |
|---|---|---|
| 1,970,575 | Reitzel | Aug. 21, 1934 |
| 1,990,404 | Doner | Feb. 5, 1935 |
| 2,117,844 | Grieco | May 17, 1938 |